(12) United States Patent
Buschjohann et al.

(10) Patent No.: US 8,393,627 B2
(45) Date of Patent: *Mar. 12, 2013

(54) LONGITUDINAL LINK FOR AN AUXILIARY FRAME, PARTICULARLY FOR MOTOR VEHICLES

(75) Inventors: Thomas Buschjohann, Nordstemmen (DE); Heiko Kauert, Ludwigsfelde (DE)

(73) Assignee: KSM Castings Group GmbH, Hildesheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/932,899

(22) Filed: Mar. 9, 2011

(65) Prior Publication Data

US 2011/0163513 A1  Jul. 7, 2011

Related U.S. Application Data

(62) Division of application No. 11/990,312, filed as application No. PCT/DE2006/001581 on Sep. 8, 2006, now Pat. No. 7,938,414.

(30) Foreign Application Priority Data

Sep. 13, 2005 (DE) .................... 10 2005 043 764

(51) Int. Cl.
*B60G 3/12* (2006.01)
*B60G 3/14* (2006.01)
*B60G 21/055* (2006.01)

(52) U.S. Cl. ... 280/124.128; 280/124.133; 280/124.134; 280/124.152

(58) Field of Classification Search ........... 280/124.116, 280/124.128, 124.132, 124.133, 124.152, 280/124.134

See application file for complete search history.

(56) References Cited

U.S. PATENT DOCUMENTS

| | | | |
|---|---|---|---|
| 4,429,900 A * | 2/1984 | Feher | 280/124.128 |
| 4,671,531 A | 6/1987 | Sautter et al. | |
| 4,815,556 A | 3/1989 | Sumimoto et al. | |
| 4,815,755 A * | 3/1989 | Takata et al. | 280/124.128 |
| 4,903,981 A * | 2/1990 | Alesso et al. | 280/86.757 |
| 5,280,957 A | 1/1994 | Hentschel et al. | |
| 5,340,146 A * | 8/1994 | Kato | 280/124.143 |
| 5,342,459 A * | 8/1994 | Klemp et al. | 148/690 |
| 5,381,850 A | 1/1995 | Otte et al. | |

(Continued)

FOREIGN PATENT DOCUMENTS

| | | |
|---|---|---|
| DE | 39 27 987 | 2/1991 |
| DE | 40 11 948 | 10/1991 |

(Continued)

OTHER PUBLICATIONS

Definition of Moulded, from Dictionary.com, available at http://dictionary.reference.com/browse/mould?r=66.*

(Continued)

*Primary Examiner* — Joseph Rocca
(74) *Attorney, Agent, or Firm* — Collard & Roe, P.C.

(57) ABSTRACT

The invention relates to an auxiliary frame (1) for multi-link rear axles of motor vehicles, comprising two lateral auxiliary frame parts (B) which are embodied at least approximately in a V-shaped manner in such an arrangement that the vertexes (6, 7) thereof face each other and are joined to each other via a central auxiliary frame part (C) that extends perpendicular to the longitudinal axis of the vehicle. The lateral auxiliary frame parts and the central auxiliary frame part are configured as hollow profiled members while the lateral auxiliary frame parts are provided with at least three of the following receptacles or recesses: the top transverse link; the bottom transverse link; the stabilizer; the longitudinal links; the fixture of the auxiliary frame to the vehicle body.

5 Claims, 4 Drawing Sheets

U.S. PATENT DOCUMENTS

| | | | |
|---|---|---|---|
| 5,507,888 A * | 4/1996 | Dickson et al. | 148/690 |
| 6,173,977 B1 * | 1/2001 | Fun | 280/124.116 |
| 6,298,962 B1 * | 10/2001 | Kato et al. | 188/371 |
| 6,357,772 B1 | 3/2002 | Pelz et al. | |
| 6,378,268 B1 | 4/2002 | Guyomard | |
| 6,623,020 B1 | 9/2003 | Satou | |
| 6,648,351 B1 | 11/2003 | Kosak | |
| 6,755,429 B1 | 6/2004 | Buchwitz et al. | |
| 6,851,691 B2 * | 2/2005 | Rasidescu et al. | 280/124.135 |
| 7,520,516 B2 * | 4/2009 | Murata | 280/124.128 |
| 7,938,414 B2 * | 5/2011 | Buschjohann et al. | 280/124.109 |
| 2004/0046349 A1 * | 3/2004 | Ackley et al. | 280/124.135 |
| 2004/0139780 A1 * | 7/2004 | Cai et al. | 72/377 |
| 2006/0071441 A1 * | 4/2006 | Mathis | 280/124.128 |

FOREIGN PATENT DOCUMENTS

| | | |
|---|---|---|
| DE | 41 20 984 | 1/1992 |
| DE | 43 43 841 | 6/1995 |
| DE | 19 653 542 | 6/1998 |
| DE | 100 52 940 | 5/2001 |
| DE | 203 19 147 | 4/2004 |
| EP | 1 262 396 | 12/2002 |
| JP | 61-200014 | 9/1986 |
| JP | 63-067439 | 3/1988 |
| JP | 2-106974 | 8/1990 |
| JP | 02-299744 | 12/1990 |
| JP | 09-193633 | 7/1997 |
| JP | 11-222152 | 8/1999 |
| JP | 2001-073056 | 3/2001 |
| JP | 2001-271861 | 10/2001 |
| JP | 2002-166714 | 6/2002 |
| JP | 2003-034112 | 2/2003 |
| JP | 2005-059813 | 3/2005 |

OTHER PUBLICATIONS

International Search Report of PCT/DE2006/001581.

* cited by examiner

US 8,393,627 B2

LONGITUDINAL LINK FOR AN AUXILIARY FRAME, PARTICULARLY FOR MOTOR VEHICLES

CROSS REFERENCE TO RELATED APPLICATIONS

This application is a divisional of and Applicants claim priority under 35 U.S.C. §§120 and 121 on U.S. application Ser. No. 11/990,312 filed on Feb. 11, 2008, which application is a national stage application under 35 U.S.C. §371 of PCT Application No. PCT/DE2006/001581 filed Sep. 8, 2006 which claims priority under 35 U.S.C. §119 from German Patent Application No. 10 2005 043 764.8 filed Sep. 13, 2005, the disclosures of each of which are hereby incorporated by reference.

BACKGROUND OF THE INVENTION

Field of the Invention

The invention relates to an auxiliary frame, more preferably a rear axle auxiliary frame for motor vehicles with multi-link rear axles.

Such multi-link rear axles in themselves offer optimal possibilities for deliberately influencing the wheel control and the driving characteristics in a wide range of driving situations. Here, the links and also other elements of a vehicle are generally preassembled into a unit on an auxiliary frame, also described as bogie or axle support and these fastened to body regions or the chassis.

However, the rear axles known to date embodied in this way frequently have the disadvantage of very high manufacturing effort and are consequently cost-intensive.

SUMMARY OF THE INVENTION

The present invention was based on the object of manufacturing such rear axles, faster, simpler and thus more cost-effectively and to expand the possible applications, which because of the higher quantities involved, in turn results in lower-priced products.

In addition, costs are to be further reduced, accuracy increased and quality improved through the use of advanced and cost-effective casting technologies as well as optimal materials.

According to the invention this is achieved in that an auxiliary frame, more preferably a rear axle auxiliary frame, is equipped in such a manner that it consists of two lateral auxiliary frame parts which are embodied at least approximately in a V-shaped manner in such an arrangement that the vertexes thereof face each other and are joined to each other via a central auxiliary frame part that extends perpendicular to the longitudinal axis of the vehicle, the lateral auxiliary frame parts and the central auxiliary frame part are configured as hollow profiled members and the lateral auxiliary frame parts comprise at least three of the following receptacles or recesses for the top transverse links
the bottom transverse links
the stabilizer
the longitudinal links
the fixture of the auxiliary frame to the vehicle body.

This can be particularly advantageous if the V-shaped lateral auxiliary frame parts comprise a U-shaped cross section with reinforcement ribs running between the legs.

The V-shaped lateral parts in their vertex region can have the foot of a Y moulded on with a cross section corresponding to the central auxiliary frame part, wherein the central auxiliary frame part can be accommodated in the vertex regions or the foot region of the Y. A square hollow profiled member, which can be an extruded profile, can be suitable as profile for the central auxiliary frame part in a particularly advantageous manner.

When using central auxiliary frame parts of different lengths, vehicles with different track width can be equipped with uniform lateral auxiliary frame parts which, because of the quantities employed, substantially favors economical manufacture.

It is furthermore advantageous if the lateral auxiliary frame parts and/or the central auxiliary frame part consist of light metal, wherein Al-alloys are particularly suitable. Here, the lateral auxiliary frame parts can be die-castings and the central auxiliary frame part, as already mentioned, an extruded profile. Such parts can be connected with each other also in a relatively simple manner through welding.

The recesses for the fastening of the auxiliary frame to the body or for passing-through of fastening elements in this case are each practically provided at the end of the legs of the lateral auxiliary frame parts.

A further inventive idea relates to a particular embodiment of a longitudinal link which can be used both in connection with an auxiliary frame of the kind described as well as with rear axles embodied in a different manner. Said longitudinal link is characterized in that said longitudinal link in its region between an articulation point on the auxiliary frame and its wheel support region moulded onto its other end as one piece is a hollow profiled member. Here, the hollow profiled member can be a closed profile for example a round profile, which preferentially consists of light metal, for example of an Al-alloy.

It is particularly advantageous with regard to the achievement of great stiffness if the longitudinal link in its region between fastening point on the auxiliary frame and its wheel support region additionally contains a hollow body, while it can be advantageous with regard to the achievement of lightweight construction, if the longitudinal link is an Al-chill casting, in which the additional hollow body is cast-in.

BRIEF DESCRIPTION OF THE DRAWINGS

The invention is explained in more detail by means of the FIGS. 1 to 7.

Here.

FIGS. 5 to 7 show a special longitudinal link according to a further inventive idea, wherein FIG. 5 shows the longitudinal link in the installed state, FIG. 6 one such in view and FIG. 7 one such in the cut state so that in the longitudinal control arm a hollow profile and an additional hollow body in the hollow profile are schematically shown.

DETAILED DESCRIPTION OF THE PREFERRED EMBODIMENTS

Figure 1:
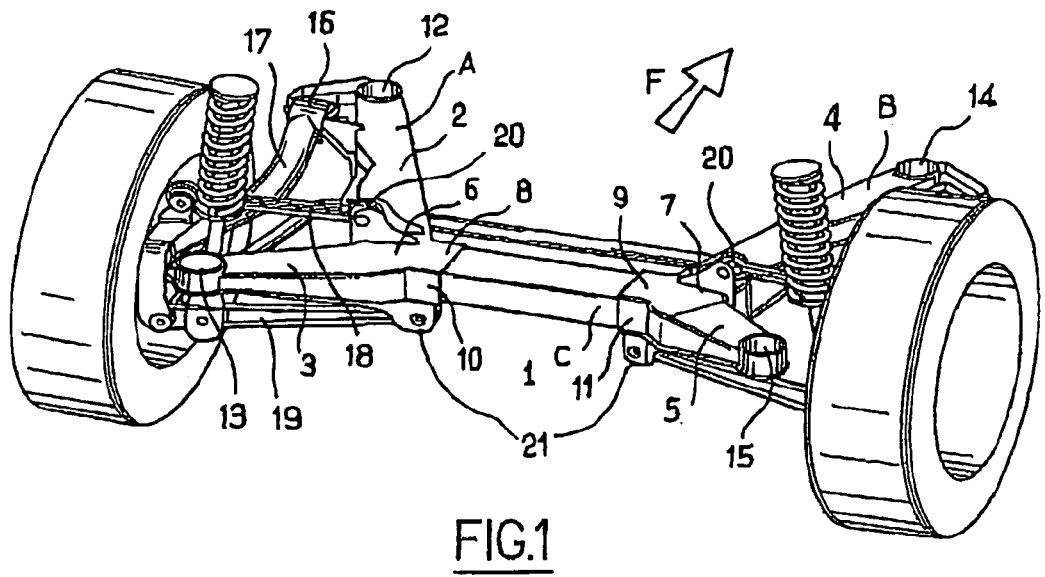
FIG. 1 shows a rear axle with an auxiliary frame 1 and axle elements fastened thereto on the example of a non-powered rear axle.

The auxiliary frame 1, with view of FIG. 1 and in the driving direction F, consists of a left lateral auxiliary frame part A and a right lateral auxiliary frame part B. Each of the lateral parts is embodied in at least an approximately V-shaped manner with legs 2, 3 as well as 4, 5. The two legs each meet in their vertex region 6, 7 and additionally have a foot shoulder 8, 9 and thus altogether an at least approximately Y-shaped embodiment. The foot shoulders face in the direction of the vehicle longitudinal axis, i.e. towards each other and have the profiling of a rectangle 10, 11 in which the central auxiliary frame part C is accommodated and welded together with the profiles 8, 9.

At the ends of the V-shaped legs the fastening points or the receptacles for the passing-through of fastening means for the articulation of the auxiliary frame to the body or the chassis of the vehicle are provided, specifically the left lateral auxiliary frame part A has a fastening point 12, a rear fastening point 13 and the right lateral auxiliary frame part B a front fastening point 14 and a rear fastening point 15. In addition, the auxiliary frame has receptacle points for the fastening of parts of the rear axle which for the sake of simplification are provided with the same reference symbols each for the right and the left lateral part and in part are also shown only once, since it practically concerns mirror-image arrangements.

The longitudinal link 17 is articulated on the fastening point 16, the top and bottom transverse links 18, 19 are articulated on the fastening points 20, 21.

Figure 2:
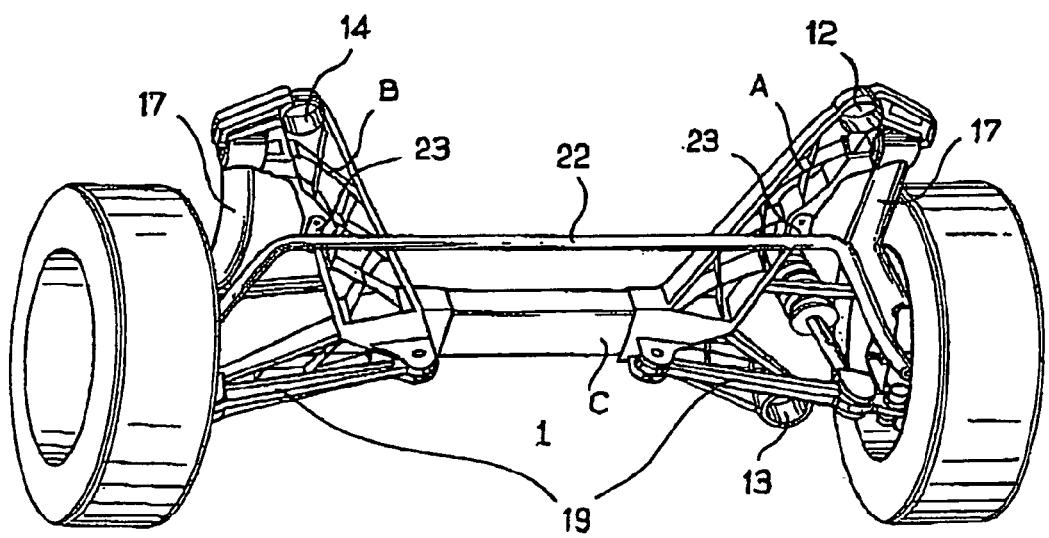
FIG. 2 shows a view from FIG. 1 swiveled about the axes XYZ.
Figure 3:
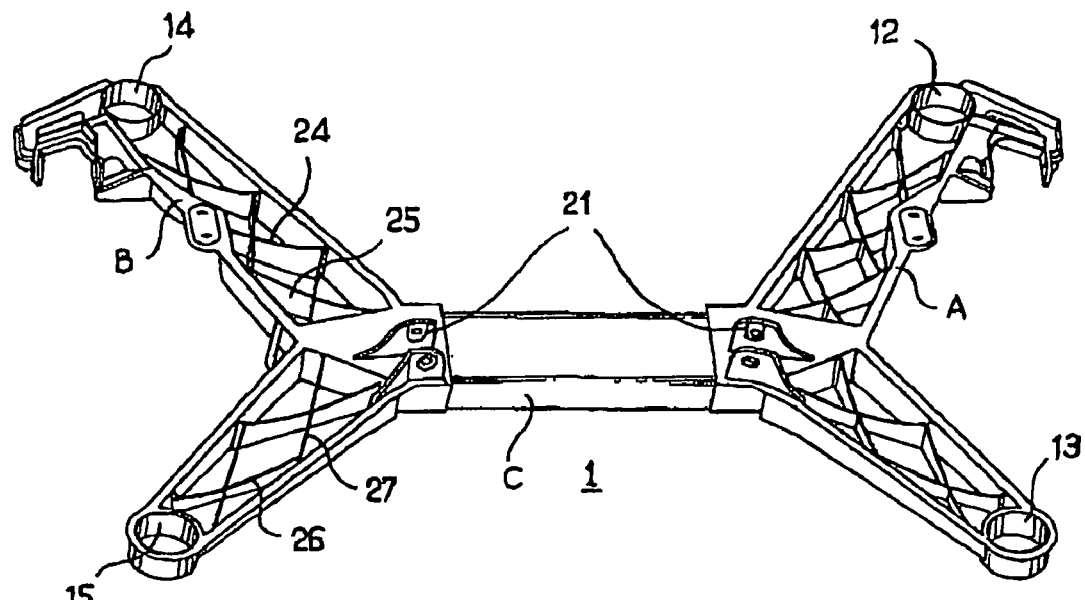
FIG. 3 shows the auxiliary frame 1 from a perspective corresponding to FIG. 2.
Figure 4:
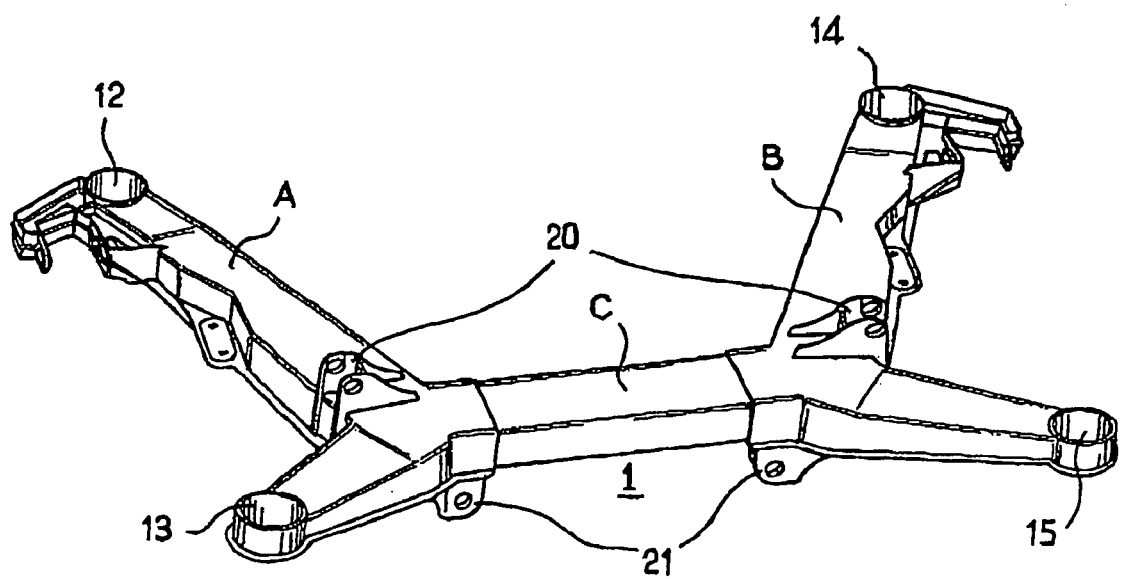
FIG. 4 a view of the auxiliary frame 1 from a similar view as FIG. 1.

For the stabilizer 22, as is more preferably evident in connection with FIGS. 2 and 3, fastening points 23 are provided on the bottom region of the lateral auxiliary frame parts.

As is more preferably evident in connection with FIGS. 2 and 3 the lateral auxiliary frame parts have a U-shaped cross section with reinforcement ribs 24, 25 and 26, 27 which at least substantially run between the U-shaped legs of the lateral parts. In a particularly favorable manner the lateral auxiliary frame parts A, B can consists of aluminum die-casting while the central auxiliary frame part C is practically a rectangular hollow profiled member that can be manufactured as aluminum extruded profile.

By varying the length of the central auxiliary frame part C rear axles with different track width can be created in a particularly economical manner.

Figure 5:
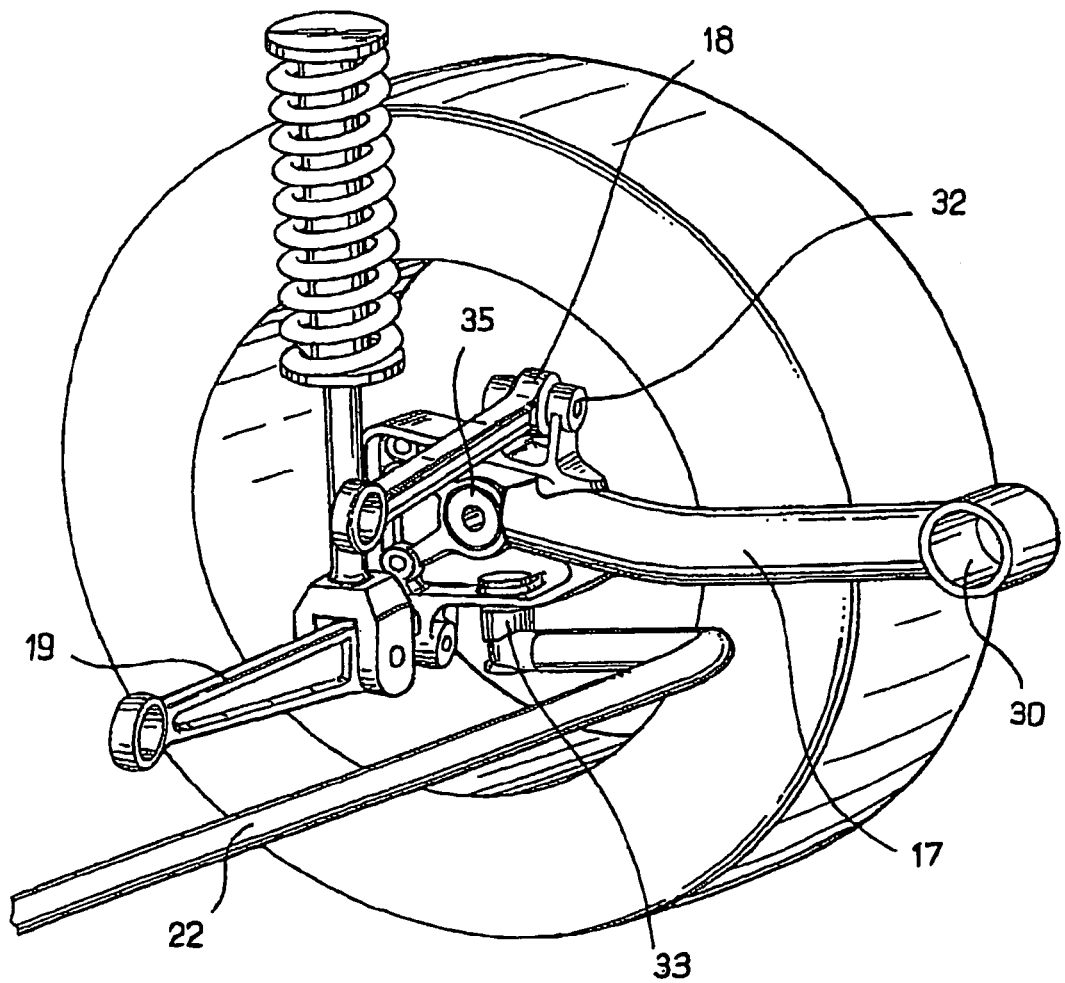
Figure 6:
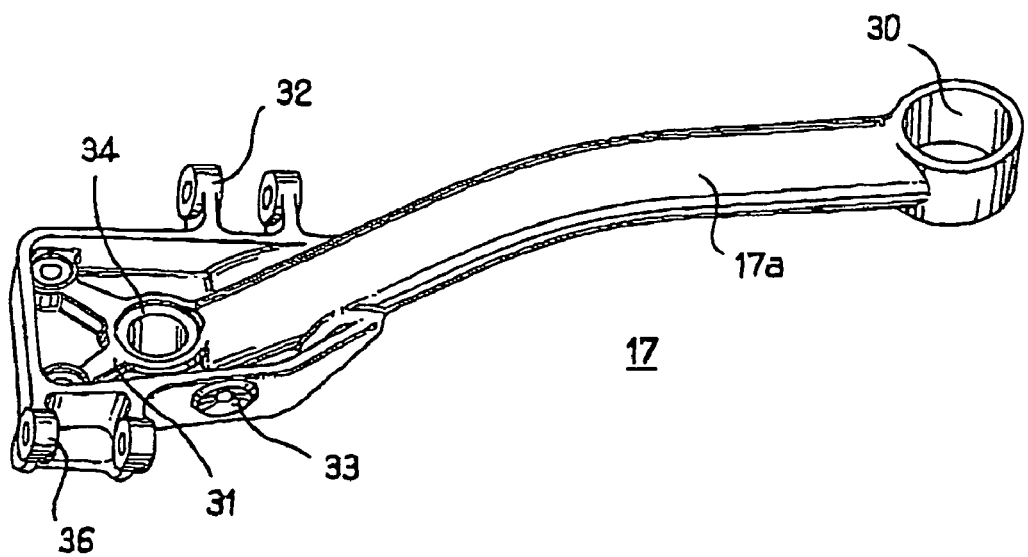
Figure 7:
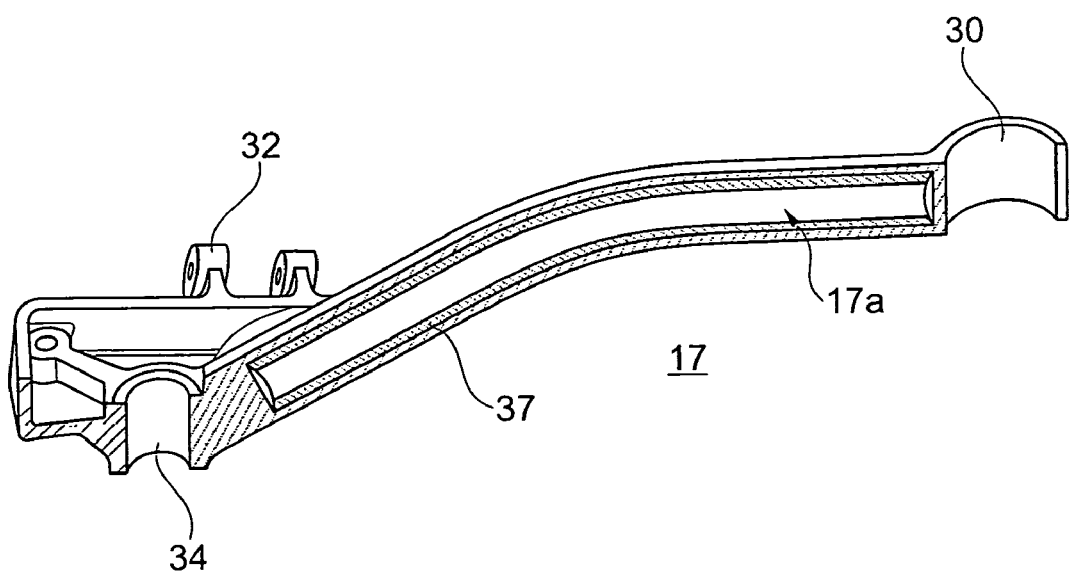

To realize an economical rear axle more preferably, however not exclusively, in connection with the present invention a longitudinal link 17 according to FIGS. 5, 6 and 7 can also be suitable according to a further inventive idea, which longitudinal link with its eye 30 can be articulated on the fastening point 16 and which, on its opposite end, has the wheel support region 31 moulded on as one piece. The region 32 serves for the articulation of the top transverse link 18 and the articulation point 33 for the articulation of the stabilizer 22. In a receptacle opening 34 a steel axle pin 35 for receiving the wheel bearing is provided. A fastening point 36 serves for the articulation of the transverse link 19.

The longitudinal link 17 with its wheel support region 31 molded on as one piece can be manufactured in a particularly favorable manner as an aluminum chill casting, which, in its region 17a located between the fastenings points 30 and 34, contains an aluminum tube 37 that is cast in. As a result, the corresponding longitudinal link is embodied as hollow profiled member for great stiffness with low mass and low costs at the same time.

What is claimed is:

1. Longitudinal control arm for an auxiliary frame, wherein the longitudinal control arm comprises a connection point for connecting on the auxiliary frame, a wheel support region, a region between the connection point and the wheel support region, and a hollow profile in the region between the connection point and the wheel support region, the hollow profile being formed on in one piece, wherein the longitudinal control arm additionally contains a hollow body in the region between the connection point and the wheel support region, the hollow body being formed on in one piece, which body increases the rigidity of the longitudinal control arm; wherein the wheel support region is moulded onto the hollow profile as one piece as an aluminum chill casting, and wherein the moulded on wheel support region includes an articulation point for articulation of a top transverse link, an articulation point for articulation of a stabilizer, and an articulation point for articulation of a bottom transverse link.

2. Longitudinal control arm according to claim 1, wherein the hollow profile is a closed profile.

3. Longitudinal control arm according to claim 1, wherein the longitudinal control arm is an aluminum cast part.

4. Longitudinal control arm according to claim 1, wherein the hollow body is cast into the longitudinal control arm.

5. Longitudinal control arm according to claim 4, wherein the hollow body is an Al hollow profile.

* * * * *